United States Patent
Parthasarathy et al.

(10) Patent No.: US 7,818,426 B2
(45) Date of Patent: Oct. 19, 2010

(54) METHOD AND SYSTEM FOR PROCESSING A MESSAGE BY A MESSAGE PROVIDER

(75) Inventors: Ramesh Parthasarathy, Bangalore (IN); Binod P. Gangadharan, Bangalore (IN); Sivakumar Thyagarajan, Bangalore (IN)

(73) Assignee: Oracle America, Inc., Redwood, CA (US)

( * ) Notice: Subject to any disclaimer, the term of this patent is extended or adjusted under 35 U.S.C. 154(b) by 570 days.

(21) Appl. No.: 11/728,625

(22) Filed: Mar. 27, 2007

(65) Prior Publication Data

US 2008/0244016 A1 Oct. 2, 2008

(51) Int. Cl.
G06F 15/16 (2006.01)
G06F 3/00 (2006.01)

(52) U.S. Cl. .................. 709/225; 709/206; 709/207; 709/223; 709/226; 718/105; 719/313; 719/314; 719/320

(58) Field of Classification Search .................. 709/206
See application file for complete search history.

(56) References Cited

U.S. PATENT DOCUMENTS

| 7,111,063 | B1 * | 9/2006 | Clark et al. ................. 709/225 |
| 7,185,061 | B1 * | 2/2007 | Gopal et al. ................. 709/207 |
| 7,305,582 | B1 * | 12/2007 | Moser et al. ................. 714/13 |
| 7,568,009 | B2 * | 7/2009 | Kirstein ................. 709/206 |
| 2005/0120095 | A1 * | 6/2005 | Aman et al. ................. 709/219 |
| 2005/0278452 | A1 * | 12/2005 | Tankov et al. ................. 709/230 |
| 2006/0126501 | A1 * | 6/2006 | Ramaswamy ................. 370/221 |
| 2007/0124398 | A1 * | 5/2007 | Parkinson et al. ................. 709/206 |
| 2007/0208814 | A1 * | 9/2007 | Czotscher et al. ................. 709/206 |

OTHER PUBLICATIONS

P.G., Binod et al.; User Guide to Generic Resource Adapter for JMS; Dec. 29, 2005; pp. 1-9 (last visited Jan. 12, 2007); (9 pages).
Haase, K.; Java™ Message Service API Tutorial; Sun Microsystems, Inc.; Chapter 3 (pp. 21-32); Chapter 6 (pp. 73-101); Chapter 9 (pp. 129-180); Chapter 10 (pp. 181-214); Date: 2002; (126 pages).

* cited by examiner

*Primary Examiner*—Ashok B Patel
*Assistant Examiner*—Linglan Edwards
(74) *Attorney, Agent, or Firm*—Osha + Liang LLP

(57) ABSTRACT

A method for processing a message by a message provider that includes receiving, for a topic, a mutual exclusion function from each application instance of a plurality of application instances, receiving the message for the topic, and sending the message to one application instance of the plurality of application instances based on executing each of the mutual exclusion functions, wherein the mutual exclusion functions ensure that the message is sent to a single application instance of the plurality of application instances.

10 Claims, 7 Drawing Sheets

METHOD AND SYSTEM FOR PROCESSING A MESSAGE BY A MESSAGE PROVIDER

CROSS-REFERENCE TO RELATED APPLICATIONS

The present application contains subject matter that may be related to the subject matter in U.S. patent application, which is assigned to the same assignee: "Method and System for Processing Messages in an Application Cluster" Ser. No. 11/728913 filed on Mar. 27, 2007. The aforementioned patent application is hereby incorporated by reference.

BACKGROUND OF INVENTION

The Message Services Application Programming Interface (API) provides an interface for communication between clients (e.g., a software application or a component thereof). The API is a Message Oriented Middleware (MOM) API that provides mechanisms for creating, sending, receiving, and reading messages using one of two models: (i) a point-to-point (i.e. queuing) model; and (ii) a publish-subscribe (i.e. topic) model.

In the point-to-point model, a producer client (i.e., a sending client) posts a message to a queue and a consumer client (i.e., a receiving client) consumes (i.e., receives and processes) the message from the queue. In the point-to-point model, the producer client is not aware of the consuming client, or even if there is a consumer client registered for the queue. The producer client sends the JMS message to a particular queue, where the message will be consumed at a later time by only one consumer client. The producer client does not have control over if and when the JMS message will be received and processed by a consumer client. Thus, the point-to-point model is one-to-one because only one consumer client consumes the posted message. Further, the consumer client typically acknowledges the receipt of the message to the producer client.

In the publish-subscribe model, a publisher client publishes a JMS message to a topic by sending the message to the topic and a subscriber client that is subscribed to the topic may receive the message. In addition, in the publish-subscribe model, multiple subscriber clients may subscribe to the same topic. Thus, all subscriber clients subscribed to the topic receive the same message when the message is published to the topic. Each subscriber client then processes the same message locally.

SUMMARY OF INVENTION

In general, in one aspect, the invention relates to a method for processing a message by a message provider that includes receiving, for a topic, a mutual exclusion function from each application instance of a plurality of application instances, receiving the message for the topic, and sending the message to one application instance of the plurality of application instances based on executing each of the mutual exclusion functions, wherein the mutual exclusion functions ensure that the message is sent to a single application instance of the plurality of application instances.

In general, in one aspect, the invention relates to a system for processing a message that includes a plurality of application instances, and a message provider configured to receive, for a topic, a mutual exclusion function from each application instance of the plurality of application instances, receive the message for the topic, send the message to one application instance of the plurality of application instances based on executing each of the mutual exclusion functions, wherein the mutual exclusion functions ensure that the message is sent to a single application instance of the plurality of application instances.

In general, in one aspect, the invention relates to a computer readable medium that includes computer readable program code embodied therein for causing a computer system to receive, for a topic, a mutual exclusion function from each application instance of a plurality of application instances, receive the message for the topic, and send the message to one application instance of the plurality of application instances based on executing each of the mutual exclusion functions, wherein the mutual exclusion functions ensure that the message is sent to a single application instance of the plurality of application instances.

Other aspects and advantages of the invention will be apparent from the following description and the appended claims.

DETAILED DESCRIPTION

Figure 1:
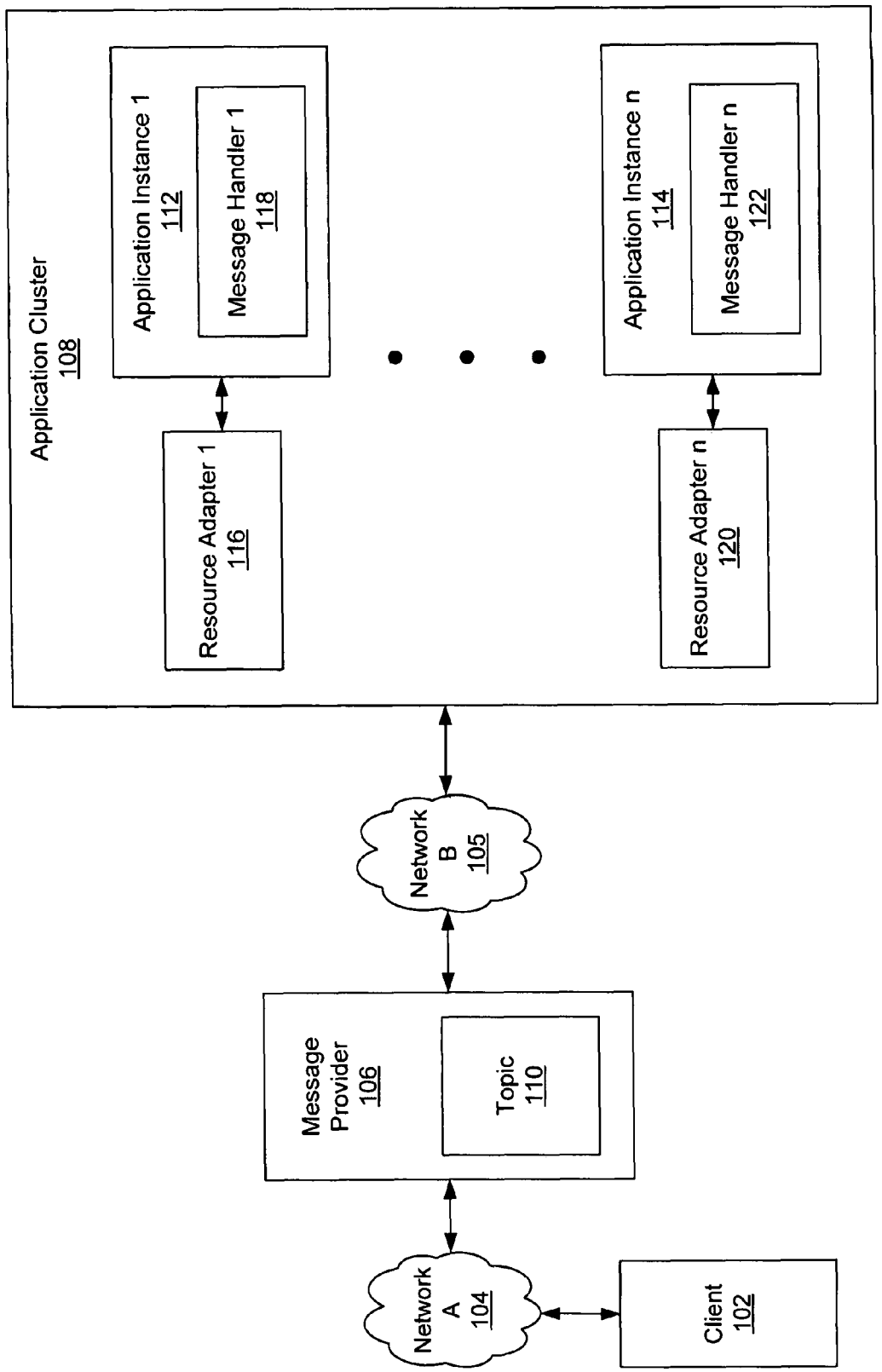
FIG. 1 shows a system in accordance with one or more embodiments of the invention.

Exemplary embodiments of the invention will now be described in detail with reference to the accompanying figures. Like items in the figures are denoted with like reference numerals for consistency.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention relate to multiple instances of an application deployed as an application cluster for increasing processing throughput capability. For example, the application may be message driven and each application instance may be in operative communication with a resource adapter that provides connectivity between the application instance and one or more message providers. Each application instance may comprise a message handler for handling messages cooperatively with the resource adapter. In some embodiments of the invention, the resource adapter may be a Java™ Messaging Service (JMS) resource adapter (JMSRA), the message handler may be a message driven bean (MDB), and the messages may be JMS messages. Java™ is a trademark of Sun Microsystems™, Inc. located in Santa Clara, Calif. In other embodiments of the invention, the resource adapter, the message handler, and the messages may be implemented according to a modular architecture other than the JMS messaging system and MDBs.

Embodiments of the invention relate to a method and system for processing messages when a topic model is used for communication. Specifically, one or more embodiments of the invention relate to a method and system for processing messages in which multiple instances of an application deployed on an application cluster are subscribed to a topic. In some embodiments of the invention, when the application instances subscribe to the topic, each application instance sends a mutual exclusion function to a message provider. The mutual exclusion functions from each application instance are used by the message provider to ensure that the message provider sends a message for the topic to only a single application instance.

FIG. 1 shows a message processing system (100) in accordance with one or more embodiments of the invention. As shown FIG. 1, the message processing system (100) includes a client (102), one or more networks (e.g., Network A (104), Network B (105)), a message provider (106), and an application cluster (108). Each of these components is described below.

In one or more embodiments of the invention, the one or more networks (e.g., Network A (104), Network B (105)) may be any public and/or private network which is wired, wireless, or is formed of any combination thereof. For example, Network A (104) may be a Local Area Network (LAN), a Metropolitan Area Network (MAN), a Wide Area Network (WAN), or any combination of a LAN, MAN and WAN.

The networks (e.g., Network A (104), Network B (105)) connect a client (102) and an application cluster (108) to a message provider (106) in accordance with one or more embodiments of the invention. In some embodiments of the invention, the client (102) may be configured to publish messages (described in more detail below in relation to FIG. 2). Specifically, a client (102) includes functionality to send a message to a topic (110). In at least one embodiment of the invention, the client (102) may generate and send a message when a predetermined event occurs. For example, in an enterprise application system for a manufacturing facility of a company, a client running the "raw materials inventory" software application may send a message when a "shortage of raw material X" event occurs.

In one or more embodiments of the invention, the client (102) is a standalone client. Alternatively, the client (102) may be an application instance in an application cluster (described below). Specifically, the client (102) may be configured to receive and process messages.

Continuing with FIG. 1, an application cluster (108) may include one or more application instances. In some embodiments of the invention, multiple instances of an application are deployed as an application cluster for increasing the processing throughput capability. For example, the application may be message driven and comprise a message handler for handling messages. In some embodiments of the invention, the message handler may be an MDB and the messages may be JMS messages. In other examples, the message handler and messages may be implemented according to a modular architecture other than the MDB and JMS.

Application instances (e.g., application instance 1 (112), application instance n (114)) may be deployed on one or more servers included in the application cluster (108). In some embodiments of the invention, the application instances (e.g., application instance 1 (112), application instance n (114)) may be Java 2 Enterprise Edition (J2EE™) compliant and may include MDBs. J2EE™ is a trademark of Sun Microsystems™ Inc. located in Santa Clara, Calif. Further, in one or more embodiments of the invention, the application instances (e.g., application instance 1 (112), application instance n (114)) may be deployed on Sun Java™ System Application Servers developed by Sun Microsystems, Inc., BEA WebLogic® Servers developed by BEA Systems, Inc., WebSpheres® Application Servers developed by International Business Machines Corporation, etc. Java™ is a trademark of Sun Microsystems, Inc. located in Santa Clara, Calif. WebLogic® is a registered trademark of BEA Systems, Inc., located in San Jose, Calif. WebSphere® is a registered trademark of International Business Machines Corporation located in Armonk, N.Y.

Each application instance (e.g., application instance 1 (112), application instance n (114)) is an instance of the same software application. The application instances (e.g., application instance 1 (112), application instance n (114)) include functionality to receive and process messages. Processing a message may include updating a storage unit, such as a file or a database, transmitting a result to a client, performing an action such as updating the inventory of the client, etc.

In one or more embodiments of the invention, each application instance (112, 114) is identified by an instance identifier (e.g., 0, 1, 2, etc.). An instance identifier uniquely identifies an application instance (e.g., application instance 1 (112), application instance n (114)) within the application cluster (108). Specifically, in one or more embodiments of the invention, the instance identifiers of application instances (e.g., application instance 1 (112), application instance n (114)) in the application cluster are positive integers. For example, the instance identifier of each application instance (e.g., application instance 1 (112), application instance n (114)) is an integer between 0 and N−1, where N is the total number of application instances deployed on the application cluster (108).

In one or more embodiments of the invention, the instance identifier is stored as a Java Virtual Machine (JVM) property that uniquely identifies each application instance (e.g., application instance 1 (112), application instance n (114)). In one or more embodiments of the invention, each application instance (e.g., application instance 1 (112), application instance n (114)) stores the instance identifier for the application instance. Further, the instance identifier may be stored by a resource adapter (RA) (e.g., RA 1 (116), RA n (120)) (described below) or a message handler (e.g., Message Handler 1 (118), Message Handler n (122)) (described below) included in the application instance (e.g., application instance 1 (112), application instance n (114)).

The instance identifier may be generated at virtually any time. For example, the instance identifier may be created at the time of deployment of the application cluster (108), at the time of deployment of an application instance (e.g., application instance 1 (112), application instance n (114)), or at any time the application instances (e.g., application instance 1 (112), application instance n (114)) deployed in the application cluster (108) change. For example, when a server executing an application instance fails, a new instance identifier may be generated for each application instance (e.g., application instance 1 (112), application instance n (114)).

In one or more embodiments of the invention, each application instance (e.g., application instance 1 (112), application instance n (114)) is operatively connected to a RA (e.g., RA 1 (116), RA n (120)). The RA (e.g., RA 1 (116), RA n (120)) includes functionality to receive messages and to subscribe to a topic (110) (described below). In one or more embodiments of the invention, each RA (e.g., RA 1 (116), RA n (120)) includes functionality to transmit a mutual exclusion function with the subscription request for a topic. When executed, the mutual exclusion function determines whether the message provider (106) should send the application instance (e.g., application instance 1 (112), application instance n (114)) corresponding to the RA (e.g., RA 1 (116), RA n (120)) a message corresponding to the topic to process.

The mutual exclusion functions sent by the application instances in the subscription requests may be used by the message provider (106) to ensure that only one application instance (e.g., application instance 1 (112), application instance n (114)) is selected for processing each message. Further, each RA (e.g., RA 1 (116), RA n (120)) includes functionality to send a message to the corresponding application instance (e.g., application instance 1 (112), application instance n (114)) for processing.

Continuing with FIG. 1, in one or more embodiments of the invention, each application instance (e.g., application instance 1 (112), application instance n (114)) includes a message handler (e.g., Message Handler 1 (118), Message Handler n (122)). A message handler (e.g., Message Handler 1 (118), Message Handler n (122)) includes functionality to subscribe to the topic (110) (described below) using an RA (e.g., RA 1 (116), RA n (120)), listen for new messages, and process messages. Further, in one or more embodiments of the invention, the message handler (e.g., Message Handler 1 (118), Message Handler n (122)) stores a total instance count of the total number of application instances (e.g., application instance 1 (112), application instance n (114)) deployed on the application cluster (108). Alternatively or additionally, the total instance count may be stored by each application instance (e.g., application instance 1 (112), application instance n (114)) and/or the corresponding RA (e.g., RA 1 (116), RA n (120)).

A message provider (106) acts as an intermediary between the client (102) and an application cluster (108). More specifically, messages may be sent to the message provider (106) by a client (102) and later sent from the message provider (106) to the application cluster (108).

In one or more embodiments of the invention, the message provider (106) may be any open source or proprietary Message Oriented Middleware (MOM). For example, a message provider (106) may be ActiveMQ developed by Apache, JBoss® Messaging developed by RedHat® Middleware, LLC, Open Message Queue or Sun Java System Message Queue developed by Sun Microsystems™ Inc., Enterprise Messaging Service™ (EMS) developed by TIBCO® Software Inc., Websphere® MQ developed by International Business Machines Corporation, SonicMQ® developed by Sonic Software®, Oracle® Enterprise Messaging Services (OEMS) developed by Oracles Corporation® etc. JBoss® is a registered trademark of RedHat® Middleware, LLC located in Raleigh, N.C. Enterprise Messaging Service™ is a trademark of TIBCO® Software Inc. located in Palo Alto, Calif. WebSphere® is a registered trademark of International Business Machines Corporation located in Armonk, N.Y. SonicMQ® is a registered trademark of Sonic Software® located in Bedford, Mass. Oracle® is a registered trademark of Oracle® Corporation located in Redwood Shores, Calif.

In one or more embodiments of the invention, the message provider (106) includes a topic (110) that stores and sends messages published to a topic. A topic (110) is a distribution mechanism whereby a message sent to the topic may be distributed to multiple registered listeners (i.e., application instances that have subscribed to the topic). A topic (110) may be an object which represents a particular subject matter of the messages. For example, a topic may represent weather for a specific region, invoice requests, etc. In one or more embodiments of the invention, the topic (110) follows the publish/subscribe model of the JMS API. In one or more embodiments of the invention, the topic (110) includes functionality to manage requests from subscribers (e.g., application instance 1 (112), application instance n (114)) to subscribe to the topic (110) in order to receive messages published to the topic (110). Moreover, the message provider (106) includes functionality to extract a mutual exclusion function from each subscription request, to execute the mutual exclusion function for each message received by the topic (110), and to send a message to a subscribed application instance (e.g., application instance 1 (112), application instance n (114)) based on the result of execution the mutual exclusion function.

In one or more embodiments of the invention, the topic (110) may include a storage mechanism (e.g., optical hard disk drive, flash memory, Random Access Memory (RAM,) removable storage, etc.) to store messages. Further, in one or more embodiments of the invention, the topic (110) may communicate with the message provider (106) over a network and may reside on a separate server from the message provider (106).

Figure 2:
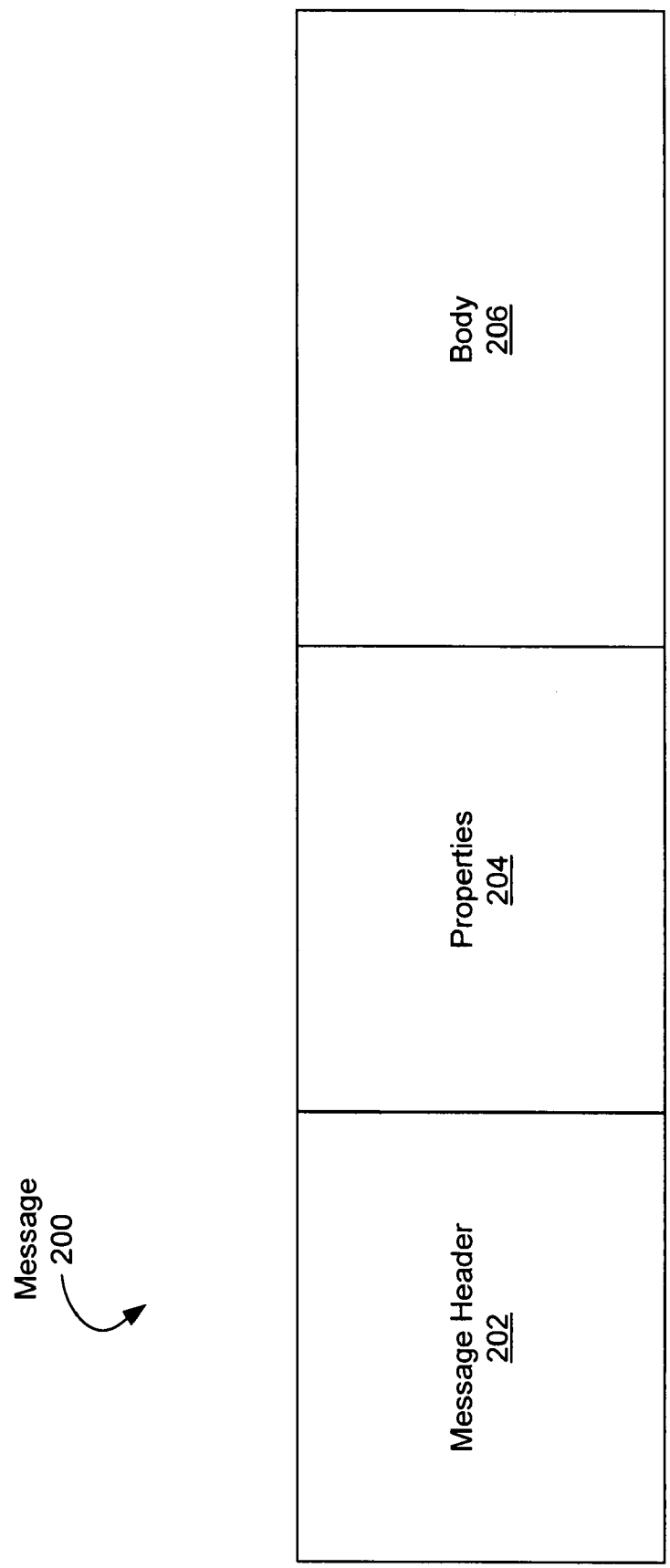
FIG. 2 shows a message in accordance with one or more embodiments of the invention.

FIG. 2 shows a message (200) in accordance with one or more embodiments of the invention. A message may be an object that includes data which is being transferred between clients. In some embodiments of the invention, a message may be a JMS message. As shown in FIG. 2, a message (200) includes a message header (202), properties (204) and a body (206) in accordance with one or more embodiments of the invention. Each of these components is described below.

In one or more embodiments of the invention, the message header (202) includes a set of pre-defined fields that include values that sender clients and receiver clients can set/update/use to identify and/or route the message (200). For example, the message header (202) may include a message identifier field that identifies the message, a destination field that identifies the topic of the message, etc. Further, the message header (202) may include an application instance selection portion (not shown). An application instance selection portion may be any value in the message that may be used to select an application instance for processing the message. For example, the application instance selection portion may be a timestamp, a hash value of the message or portion thereof, an identifier of the sender of the message, a security code in the message, a size of the message, etc. In some embodiments of the invention, a timestamp is the time and/or date that the message was received by a message provider (e.g., message provider (106)). Alternatively, the timestamp (208) may identify the time in which the message was sent by the client. Further, in another alternative, the timestamp (208) may not exist.

In addition to the message header (202), the message (200) may also include properties (204). In one or more embodiments of the invention, the properties (204) may be custom properties of the message (200). For example, the properties (204) may be used to provide compatibility with non-messaging systems, to define one or more unique values to be used in identifying an application instance selection portion, etc. In one or more embodiments of the invention, the properties (204) are optional.

In one or more embodiments of the invention, the body (206) includes the actual content of the message (200). For example, the message (200) may correspond to a text message incorporating contents of an Extensible Markup Language (XML) file, a stream message incorporating a stream of primitive values in the Java programming language which are filled and read sequentially, a byte message incorporating a stream of un-interpreted bytes to literally encode the body to match an existing message format, etc. In one or more embodiments of the invention, the body (206) of the message (200) is also optional.

Figure 3:
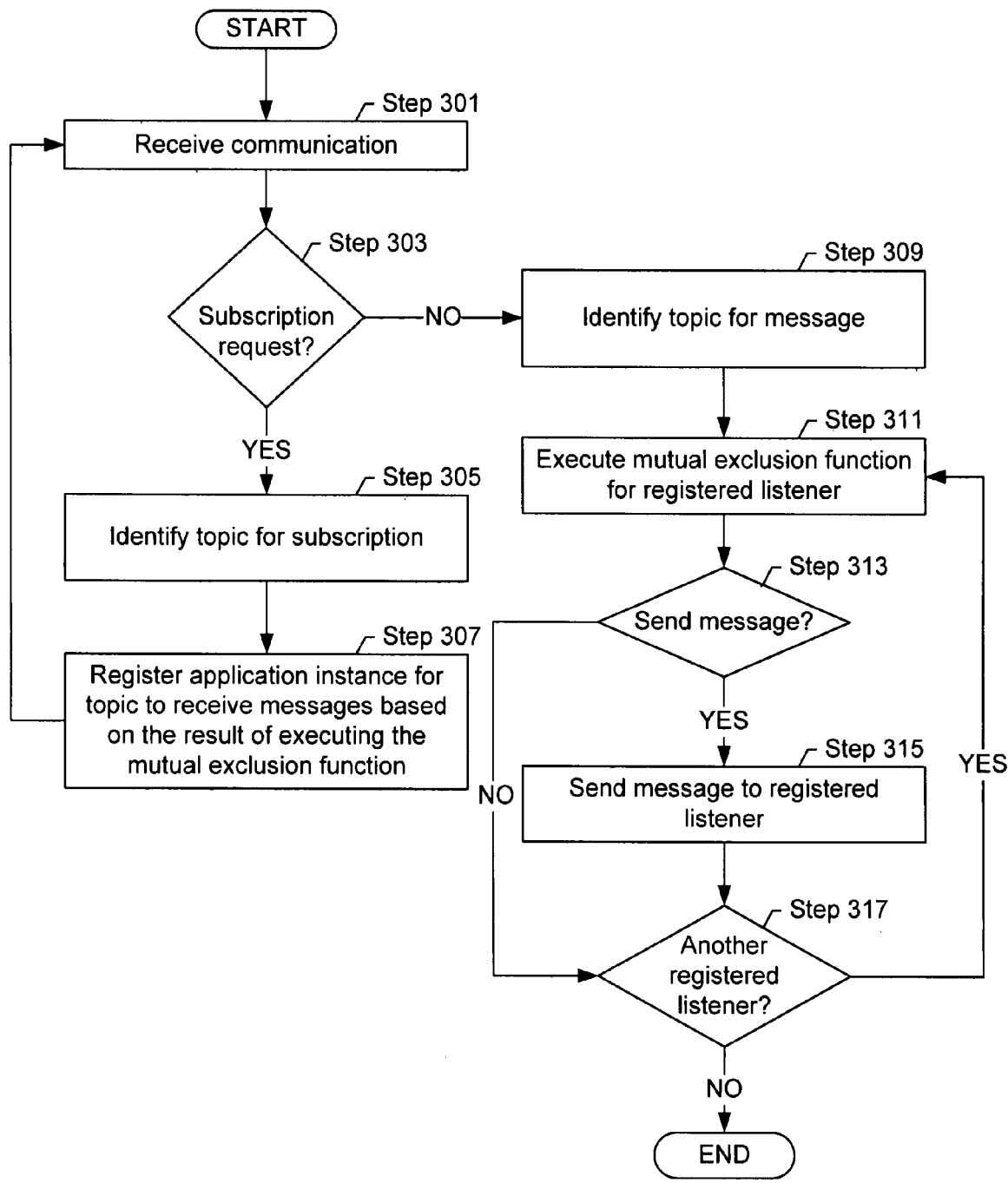
FIG. 3 shows a flowchart in accordance with one or more embodiments of the invention.

FIG. 3 shows a flowchart of processing a message by a message provider in accordance with one or more embodiments of the invention. While the various steps in this flowchart are presented and described sequentially, one of ordinary skill will appreciate that some or all of the steps may be executed in different orders and some or all of the steps may be executed in parallel.

Initially, a communication is received by the message provider (Step 301). A determination is made whether the communication is a subscription request (Step 303). In some embodiments of the invention, an application instance may use an RA corresponding to the application instance to generate a request to subscribe to a topic. The RA includes a mutual exclusion function and the topic in the subscription request. In one or more embodiments of the invention, the mutual exclusion function is a conditional expression that specifies that a message is to be sent the application instance when the application instance selection portion mod the total number of application instances is equal to the identifier of the application instance.

In one or more embodiments of the invention, the instance identifier may be obtained by querying the JVM property corresponding to the instance identifier of the application instance corresponding to the RA. Additionally, the total instance count may be obtained by querying the message handler of the application instance. Further, in one or more embodiments of the invention, the instance identifier and the total instance count are accessible to the RA through a standard interface. Once the instance identifier and total instance count is obtained, in one or more embodiments of the invention, the RA stores the instance identifier and the total instance count.

Using the instance identifier and the total instance count, the RA creates a mutual exclusion function. Specifically, the mutual exclusion function may specify that any message received to the topic mod the total instance count should equal the instance identifier of the application instance. The mutual exclusion function may have the timestamp as a variable and the total instance count and the instance identifier as constants. In one or more embodiments of the invention, the created mutual exclusion function is stored in a filter portion of a subscription request. The filter portion is a component of a subscription request which filters messages that are sent to the topic. For example, the filter portion may be a JMS custom selector in a JMS subscription request. Then, the RA may send the subscription request to the message provider.

Continuing with FIG. 3, if the communication is a subscription request, then the message provider identifies the topic for the subscription request from information included in the subscription request (Step 305). Further, the message provider extracts the mutual exclusion function from the subscription request. Specifically, the message provider identifies a filter portion in the subscription request in a manner similar to identifying the topic. To the message provider, the mutual exclusion function in the filter portion is a conditional expression which specifies which messages are sent to the application instance that created the subscription request. Next, the message provider registers this subscription for the application instance to receive messages from the topic based on the result of executing the mutual exclusion function (Step 307). Thus, the application instance becomes a registered listener of the topic.

Alternatively, if the communication is not a subscription request, then the communication is a message for registered listeners of a topic. Accordingly, the message provider identifies the topic (Step 309). Based on the topic, the message provider identifies the registered listeners of the topic for the message (not shown).

After identifying a registered listener, the message provider identifies the mutual exclusion function sent by the registered listener (not shown). Further, the message provider executes the mutual exclusion function for the registered listener (Step 311). In one or more embodiments of the invention, executing the mutual exclusion function may include extracting the application instance selection portion from the message. As discussed above, the application instance selection portion may correspond to a timestamp, a hash value of the message or portion thereof, an identifier of the sender of the message, a security code in the message, etc. Using the application instance selection portion, the mutual exclusion function is executed. As discussed above, executing the mutual exclusion function may involve performing a modulo operation of the total number of application instances with the application instance selection portion to generate an instance identifier. Further, the generated instance identifier may be compared with an instance identifier of the registered listener (i.e., application instance that sent the mutual exclusion function).

Based on the result of executing the mutual exclusion function, a determination is made whether to forward the message to the registered listener (Step 313). In one or more embodiments of the invention, the result of the calculation may be a Boolean variable that has at most two values (i.e., true and false, 0 and 1, or any form thereof). If the determination is made to send the message, then the message is sent to the registered listener (Step 315).

Accordingly, the message is processed by the registered listener. In some embodiments of the invention, the message may be intercepted by the resource adaptor for initial processing before being sent to the application instance. Further, in one or more embodiments of the invention, the message handler of the application instance connected to the RA processes the received message.

Alternatively, if the determination is made not to send the message, then a determination is made whether another registered listener exists (Step 317). If another registered listener exists, then the message provider executes the mutual exclusion function for the next registered listener (Step 311). In one or more embodiments of the invention, the message provider may execute the mutual exclusion function for each registered listener even if the message is sent to one of the registered listeners.

In some embodiments of the invention, each application instance that becomes a registered listener specifies a mod operation for the mutual exclusion function thus ensuring that the message is sent to a single application instance. In such embodiments, while the message provider may iterate through the mutual exclusion function for each application instance which is a registered listener, the message provider sends the message to a single application instance.

If any changes occur in the application instances deployed on the application cluster (e.g., stop an application instance, deploy a new application instance, etc.), the application instances may be redeployed to update the total instance count and the instance identifier values of each of the application instances. Alternatively, instance identifiers and the total instance count may be reassigned or redistributed to affected application instances, MDBs, and/or RAs when changes to the deployed application instances occur. After the instance identifier and the total instance count are updates, each application instance may send a new subscription request to the message provider to change the mutual exclusion function.

Figure 4A:
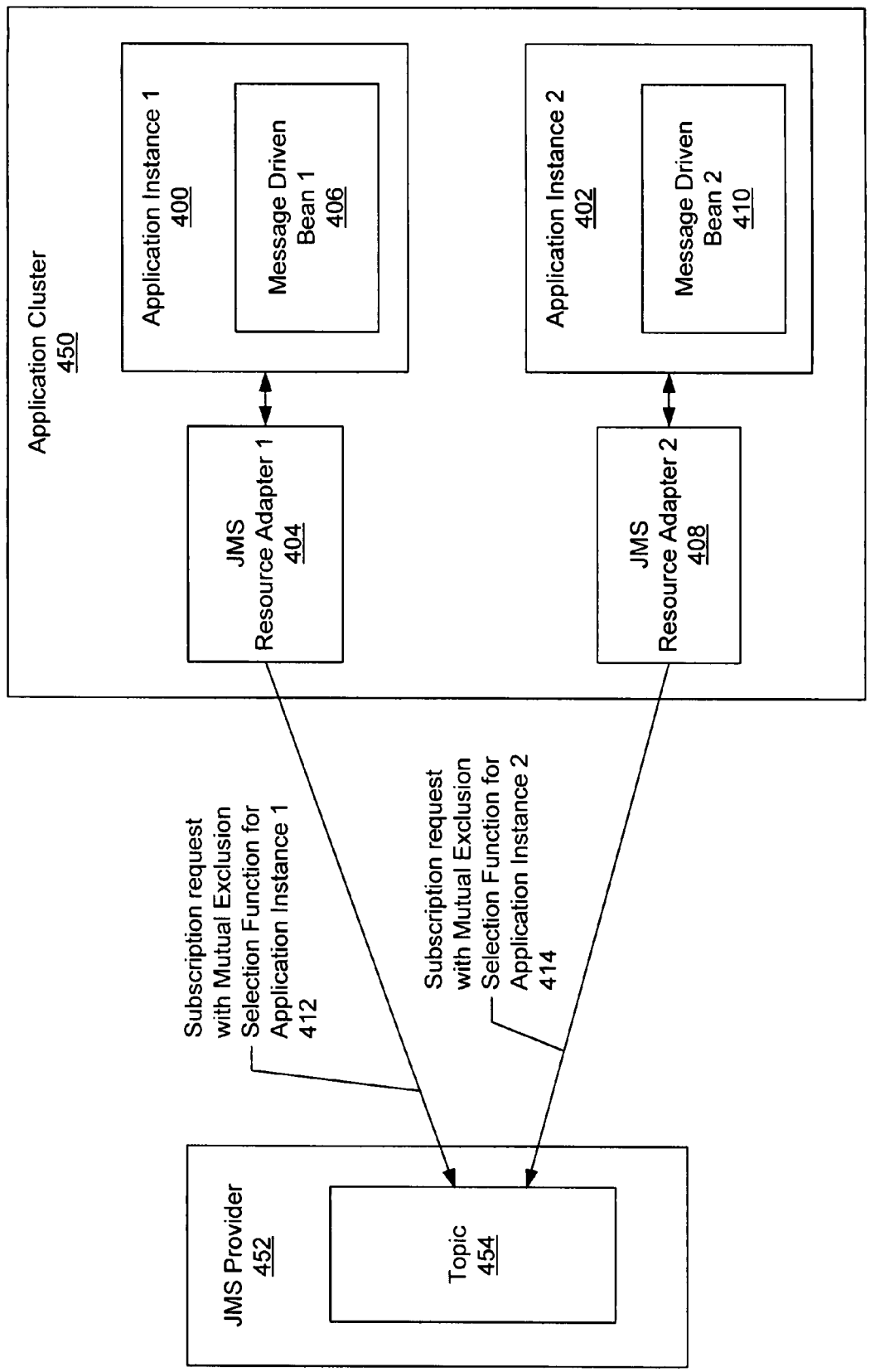
FIGS. 4A-4C show an example in accordance with one or more embodiments of the invention.

FIGS. 4A-4D show an example flow of processing of a message in accordance with one or more embodiments of the invention. FIG. 4A shows an example application cluster (450) and JMS provider (452). For the following example, consider the scenario in which application instance 1 (400) and application instance 2 (402) are deployed on an application cluster (450). Application instance 1 (400) includes MDB 1 (406) and application instance 2 (402) includes MDB 2 (410). Further, JMSRA 1 (404) is connected to application instance 1 (400) and JMSRA 2 (408) is connected to application instance 2 (402).

Further, since the total number of application instances deployed on the application cluster (450) is two, a variable indicating a total instance count with a value of two is stored on MDB 1 (406) and MDB 2 (410). Continuing with the example, the instance identifier for application instance 1 (400) has a value of zero and the instance identifier for application instance 2 (402) has a value of one.

In the example shown in FIG. 4A, consider the scenario in which application instance 1 (400) and application instance 2 (402) are instances of an application for reordering sold items to restock inventory. Each application instance (e.g., application instance 1 (400), application instance 2 (402)) subscribes to the topic (454) to receive JMS messages that are generated in response to a "generation of a new sales invoice" event.

Specifically, JMSRA 1 (404) sends a subscription request with a mutual exclusion function for application instance 1 (412). The mutual exclusion function may specify that when the timestamp of a message mod 2 is equal to 0, then the message should be sent to application instance 1 (400). Similarly, JMSRA 2 (408) sends a subscription request with a mutual exclusion function for application instance 2 (414). The mutual exclusion function may specify that when the timestamp of a message mod 2 is equal to 1, then the message should be sent to application instance 2 (402). Thus, application instance 1 (400) and application instance 2 (402) become registered listeners of the JMS messages directed to the topic (454).

Figure 4B:
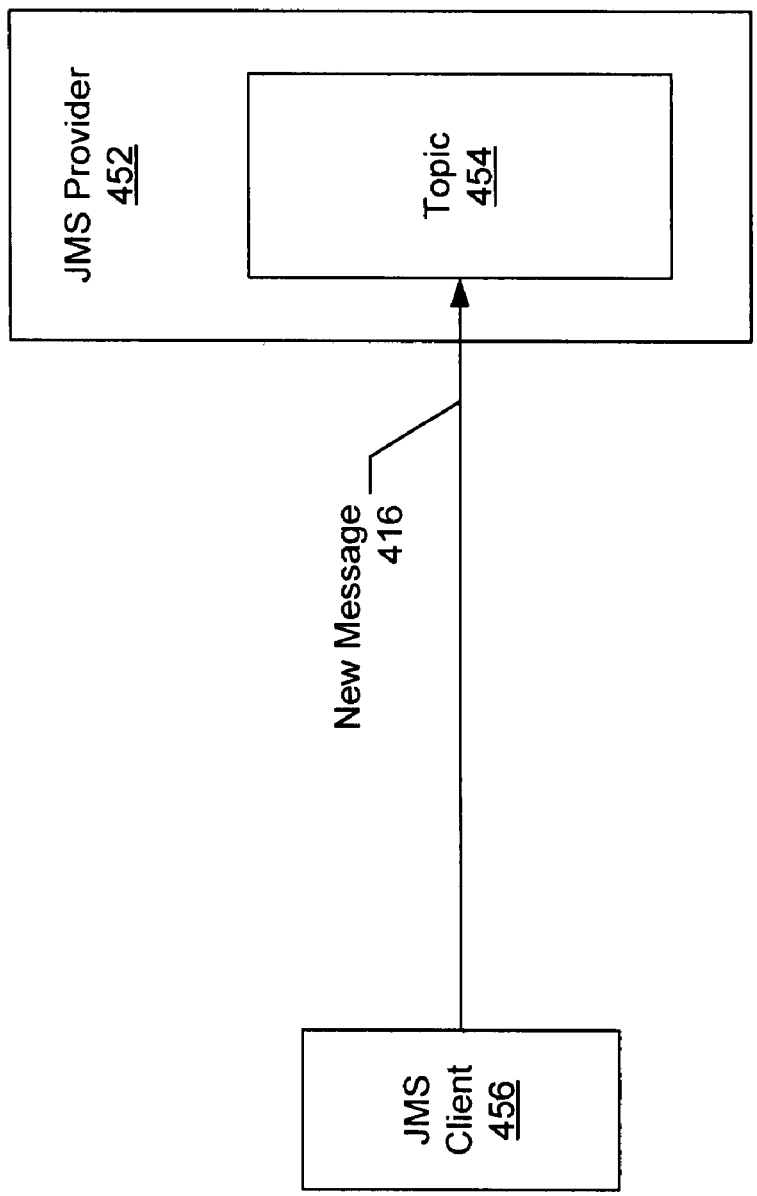
Figure 4C:
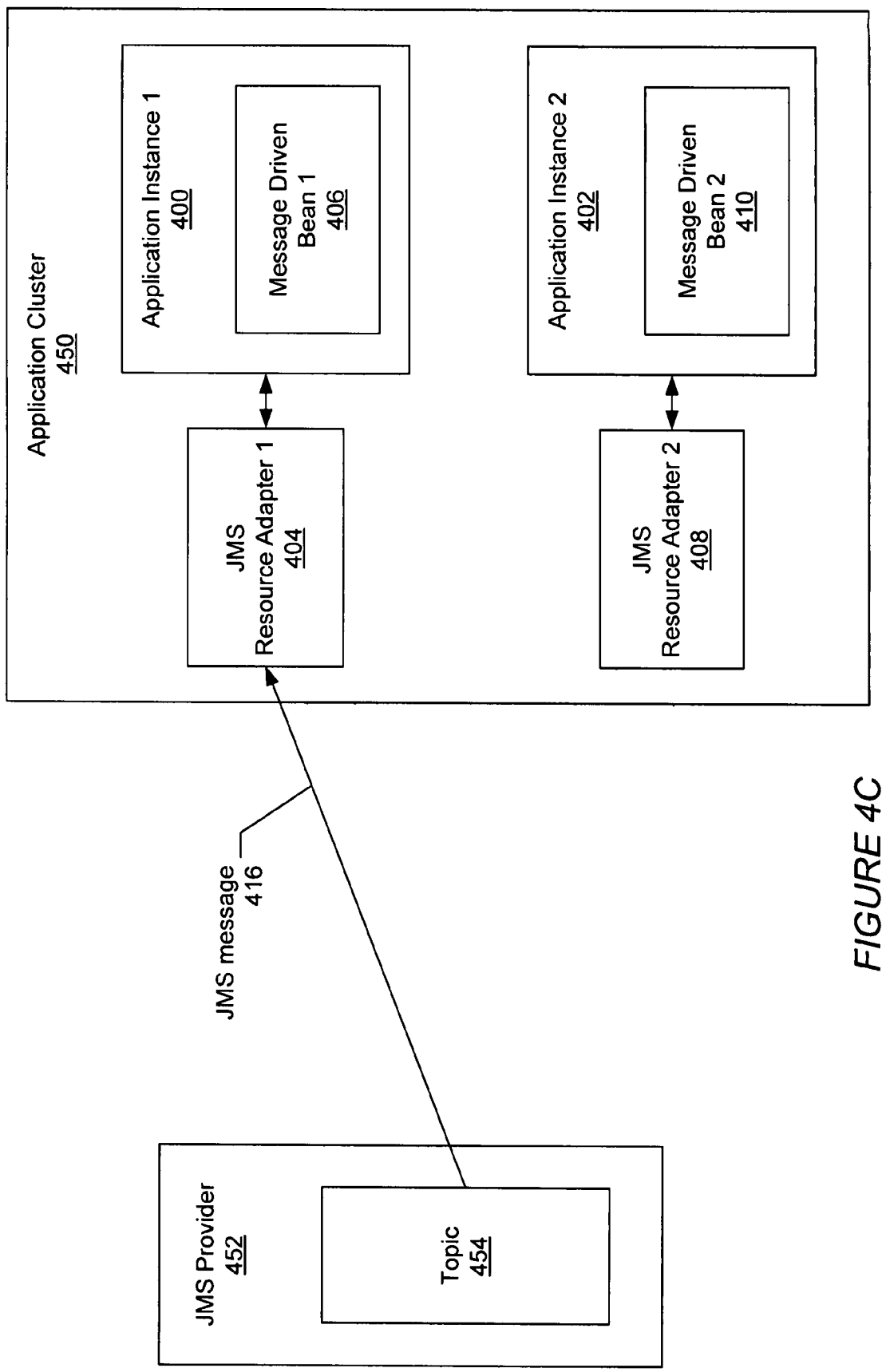

Continuing with the example to FIG. 4B, when a new sales invoice event occurs, a new JMS message (416) is published by the JMS client (456) to the topic (454). The JMS provider (452) may add a timestamp value of "500" in the application instance selection portion of the new JMS message (416). Next, the JMS provider (452) may execute each mutual exclusion function to identify the application instance to which the JMS message (416) is to be sent. In particular, the JMS provider (452) identifies that the JMS message (416) is to be sent to application instance 1 when the timestamp of a message mod 2 is equal to 0. As shown in FIG. 4C, because 500 mod 2 equals 0, the JMS message (416) is sent to application instance 1 (400) via JMSRA 1 (404). Additionally, the JMS provider (452) may execute the mutual exclusion function for application instance 2 (402). Because 500 mod 2 does not equal 1, the JMS message (416) is not sent to application instance 2 (402).

After application instance 1 (400) receives the JMS message (416), application instance 1 (400) processes the JMS message (416) which results in the items included on the sales invoice being re-ordered from a pre-defined supplier. Accordingly, the client is sent new products to replace the sold products. As shown in the example, the mutual exclusion functions sent by the JMSRA ensure that mutual exclusion is achieved, i.e., that only one application instance receives the JMS message for processing.

Figure 5:
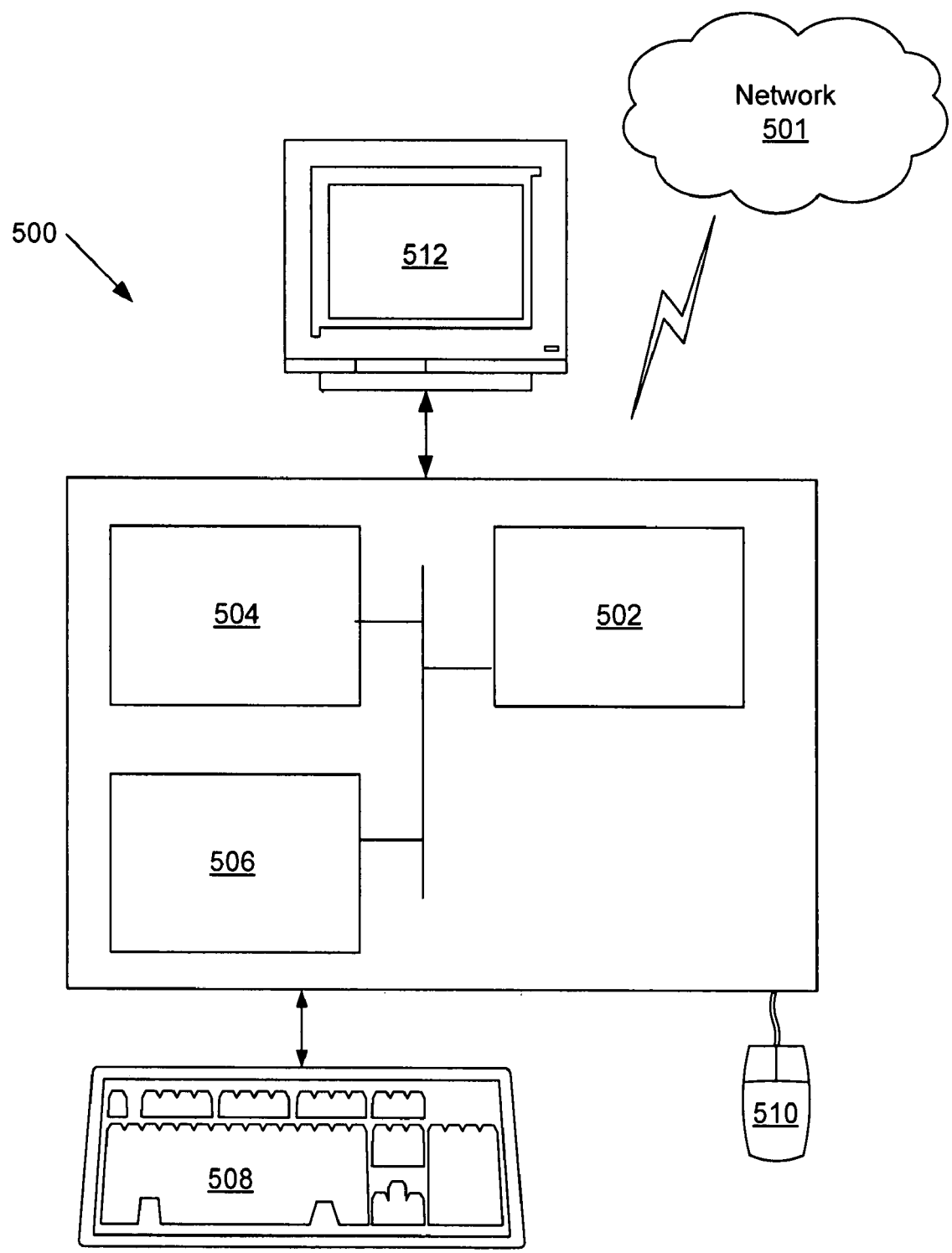
FIG. 5 shows a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (501) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., JMS client, JMS provider, application cluster, etc.) may be located on a different node within the distributed system. In one embodiment of the invention, the node may be a computer system. Alternatively, the node may be a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

One or more embodiments of the invention achieve mutual exclusion in processing messages without communication between the application instances or the RAs. In particular, once the instance identifier and the total number of instances are known, each RA may send a mutual exclusion function to the message provider that the message broke may use to select an application instance for processing the message without requiring any communication between application instances or RAs.

Furthermore, one or more embodiments of the invention create a technique for mutually exclusive processing of messages without modifying the code in the application instance. Specifically, in one or more embodiments of the invention, the RA acts as a plug-in to the application instance.

Additionally, one or more embodiments of the invention provide a form of load balancing for processing JMS messages. Specifically, when the application instance selection portion is a random variable, such as a timestamp, the distribution of messages to the application instances provides a type of load balancing as the message processing load is randomly distributed among the application instances. Further, in one or more embodiments of the invention, when a predictable attribute is chosen as the application instance selection portion, then the distribution of messages is predictable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a message by a message provider comprising:

receiving, for a topic, a subscription request comprising a mutual exclusion function from each application instance of a plurality of application instances, wherein the mutual exclusion function from each application instance is a conditional expression that specifies to send messages to the application instance when an application instance selection portion mod a total number of application instances is equal to an identifier of the application instance, wherein the messages comprise the application instance selection portion;

receiving the message for the topic; and sending the message to one application instance of the plurality of application instances based on executing each of the mutual exclusion functions, wherein the mutual exclusion functions ensure that the message is sent to a single application instance of the plurality of application instances.

2. The method of claim 1, wherein the application instance selection portion is a timestamp value.

3. The method of claim 1, wherein the message is a Java Messaging Service message.

4. The method of claim 1, wherein the plurality of application instances is deployed on at least one application server and wherein the at least one application server is Java 2 Enterprise Edition (J2EE) compliant.

5. A system for processing a message comprising:

a plurality of application instances;

a processor; and a message provider, when executed by the processor, configured to:

receive, for a topic, a subscription request comprising a mutual exclusion function from each application instance of the plurality of application instances, wherein the mutual exclusion function from each application instance is a conditional expression that specifies to send messages to the application instance when an application instance selection portion mod a total number of application instances is equal to an identifier of the application instance, wherein the messages comprise the application instance selection portion;

receive the message for the topic;

send the message to one application instance of the plurality of application instances based on executing each of the mutual exclusion functions, wherein the mutual exclusion functions ensure that the message is sent to a single application instance of the plurality of application instances.

6. The system of claim 5, wherein the application instance selection portion is a timestamp value.

7. The system of claim 5, wherein the message is a Java Messaging Service message.

8. The system of claim 5, wherein the plurality of application instances is deployed on at least one application server and wherein the at least one application server is Java 2 Enterprise Edition (J2EE) compliant.

9. A non-transitory computer readable medium comprising computer readable program code embodied therein for causing a computer system to:

receive, for a topic, a subscription request comprising a mutual exclusion function from each application instance of a plurality of application instances, wherein the mutual exclusion function from each application instance is a conditional expression that specifies to send messages to the application instance when an application instance selection portion mod a total number of application instances is equal to an identifier of the application instance, wherein messages comprise the application instance selection portion;

receive the message for the topic; and send the message to one application instance of the plurality of application instances based on executing each of the mutual exclusion functions, wherein the mutual exclusion functions ensure that the message is sent to a single application instance of the plurality of application instances.

10. The computer readable medium of claim 9, wherein the application instance selection portion is a timestamp value.

* * * * *